(12) United States Patent
Clark et al.

(10) Patent No.: US 6,578,794 B1
(45) Date of Patent: Jun. 17, 2003

(54) METHODS AND SYSTEMS FOR JET ENGINE OVERTHRUST PROTECTION

(75) Inventors: Aidan William Clark, Cincinnati, OH (US); Hans Max Ortlepp, Milford, OH (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/724,063

(22) Filed: Nov. 28, 2000

(51) Int. Cl.[7] .............................................. G05B 23/00
(52) U.S. Cl. ..................... 244/75 R; 244/194
(58) Field of Search .................. 244/75, 12.4, 75 R, 244/76 R, 180, 181, 194, 135 C

(56) References Cited

U.S. PATENT DOCUMENTS

| | | | | |
|---|---|---|---|---|
| 3,627,237 A | * | 12/1971 | Smith | 244/77 |
| 4,536,843 A | * | 8/1985 | Lambregts | 364/434 |
| 4,993,221 A | | 2/1991 | Idelchik | |
| 5,301,500 A | | 4/1994 | Hines | |
| 5,394,689 A | | 3/1995 | D'Onofrio | |
| 5,486,997 A | | 1/1996 | Reismiller et al. | |
| 5,806,052 A | | 9/1998 | Bonissone et al. | |
| 5,833,177 A | * | 11/1998 | Gast | 244/195 |
| 6,041,273 A | * | 3/2000 | Burken et al. | 701/3 |
| 6,062,513 A | * | 5/2000 | Lambregts | 244/175 |
| 6,186,447 B1 | * | 2/2001 | Virdee | 244/188 |
| 6,236,914 B1 | * | 5/2001 | Kaloust | 701/11 |

OTHER PUBLICATIONS

Bonsor, Kevin, "How Racef/x Works", www.howstuffworks.com.*

* cited by examiner

Primary Examiner—Charles T. Jordan
Assistant Examiner—Stephen A. Holzen
(74) Attorney, Agent, or Firm—Nathan D. Herkamp; Robert B. Reeser, III; Armstrong Teasdale LLP

(57) ABSTRACT

A method for sensing and reacting to jet engine fan speed in excess of a fan speed computed from an aircraft throttle input is disclosed. Engine fan speeds are detected by adding test conditions to a main central processing unit (CPU) and adding test conditions to an independent overspeed module to provide additional protection from main CPU computational errors. Interpretation of sensor data relating to engine speed may initiate a modeling routine for sensor data. Comparison of measured/computed sensor data to desired conditions using logic and data tables is a used. If an anomaly is detected, engine fuel cutback devices are engaged.

20 Claims, 3 Drawing Sheets

METHODS AND SYSTEMS FOR JET ENGINE OVERTHRUST PROTECTION

BACKGROUND OF THE INVENTION

This invention relates generally to electronic control and monitoring of certain jet engine performance parameters and more specifically to electronic control of jet engine overspeed and overthrust.

Under some operating conditions, multiple engine aircraft may be susceptible to lateral stability problems when one engine erroneously produces more than the commanded level of thrust. For example, one such operating condition is that of the aborted takeoff, and more specifically, runway procedures following an aborted takeoff.

To minimize the effects of an engine failing during such flight conditions, specific techniques are used to increase the aircrafts tolerance to uncommanded asymmetric thrust. Aircraft engines typically include control features that detect and respond with control action when engine rotor speeds reach the maximum level to which the engines are certified. Other aircraft include systems that sense a difference in side-to-side engine thrust and then automatically adjust rudder position to compensate for the fan speed differences.

Such aircraft stability control techniques are directed to lateral stability control in flight, but are limited during landing or aborted take-off. It would be desirable to address uncommanded engine overthrust detection and control by adding test conditions to known overspeed detection schemes, thereby providing improved reliability in the detection and control of uncommanded overthrust conditions.

BRIEF SUMMARY OF THE INVENTION

In an exemplary embodiment, a control system senses jet engine fan speed in excess of a fan speed computed from an aircraft throttle input and responds by adding test conditions to a main central processing unit (CPU) and adding test conditions to an independent overspeed module that provide additional protection from main CPU computational errors. The test conditions include interpretation of sensor data relating to the speed of an engine and further include modeling capability for sensor data when actual sensor data is not within a predetermined tolerance. Logic and data tables are used to compare measured/computed conditions to desired conditions and if an anomaly is detected, an engine fuel cutback device is engaged reducing fuel flow to the engine which is not functioning as desired.

DETAILED DESCRIPTION OF THE INVENTION

Figure 1:
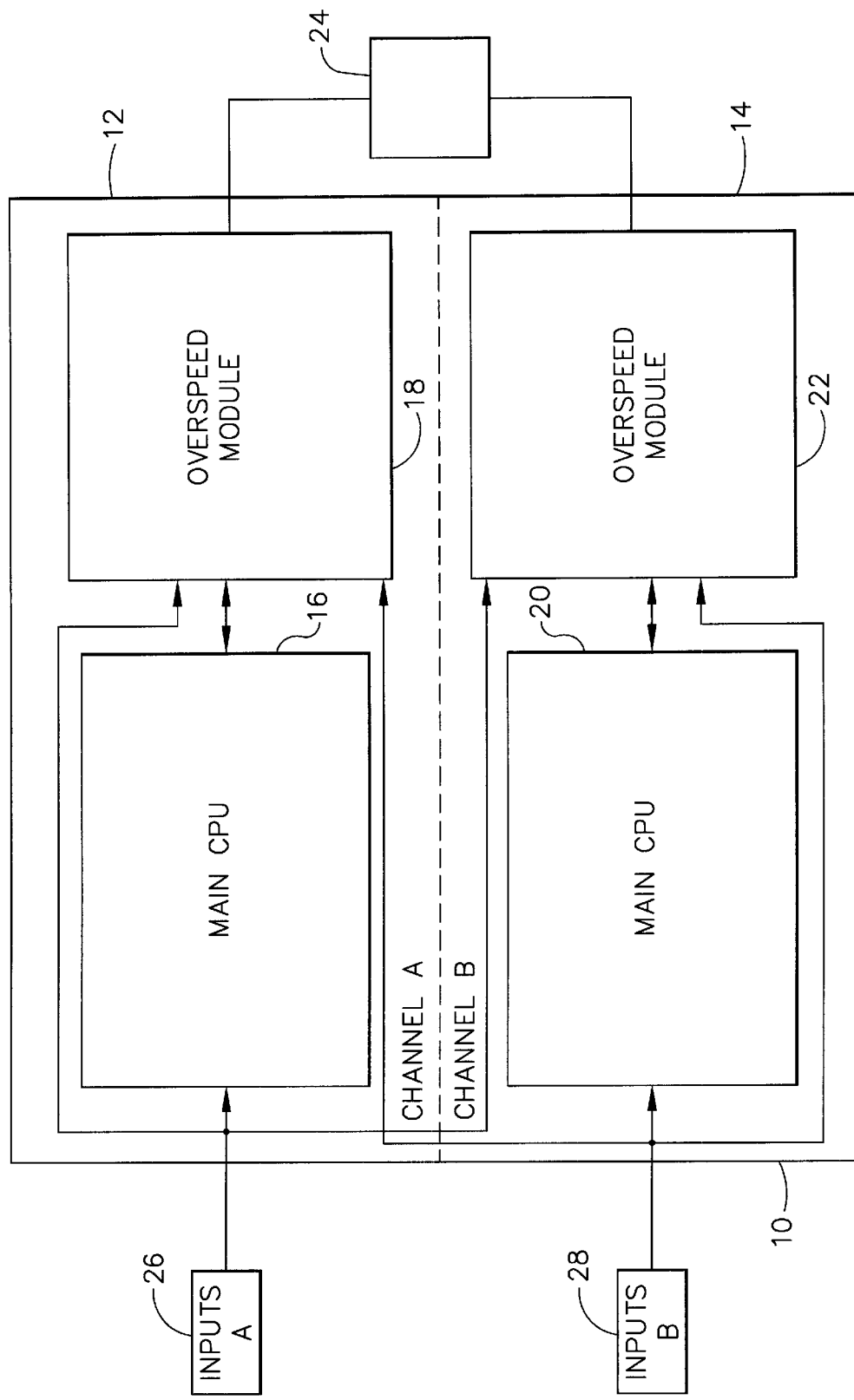
FIG. 1 is a simplified block diagram of a typical engine control system with independent engine overspeed protection.

FIG. 1 is a simplified block diagram of an engine control system 10 with independent overspeed detection. System 10 is dual redundant in that system 10 includes two identical engine control and engine overspeed modules, channel A 12 and channel B 14. Channel A 12 includes a main central processing unit 16 and an overspeed module 18. Channel B 14 also includes a main central processing unit 20 and an overspeed module 22. Overspeed modules 18 and 22 include logic and other circuitry for reducing engine power level when an overspeed condition has been detected and a signal is transmitted to a fuel cutback device 24.

The redundancy of system 10 is enhanced because channel A 12 and channel B 14 each receive inputs from sensors (not shown) which are also redundant. Channel A 12 receives sensor input directly from inputs 26 and channel B 14 receives sensor input directly from inputs 28. Inputs 26 and 28 cross feed the same information to the other, respectively, channel B 14 and channel A 12. To provide protection from spurious indications or non-intended engine fuel cutbacks, specific inputs from inputs 26 are routed into overspeed module 22 of channel B 14 and specific inputs from inputs 28 are routed to overspeed module 18 in channel A 12.

Figure 2:
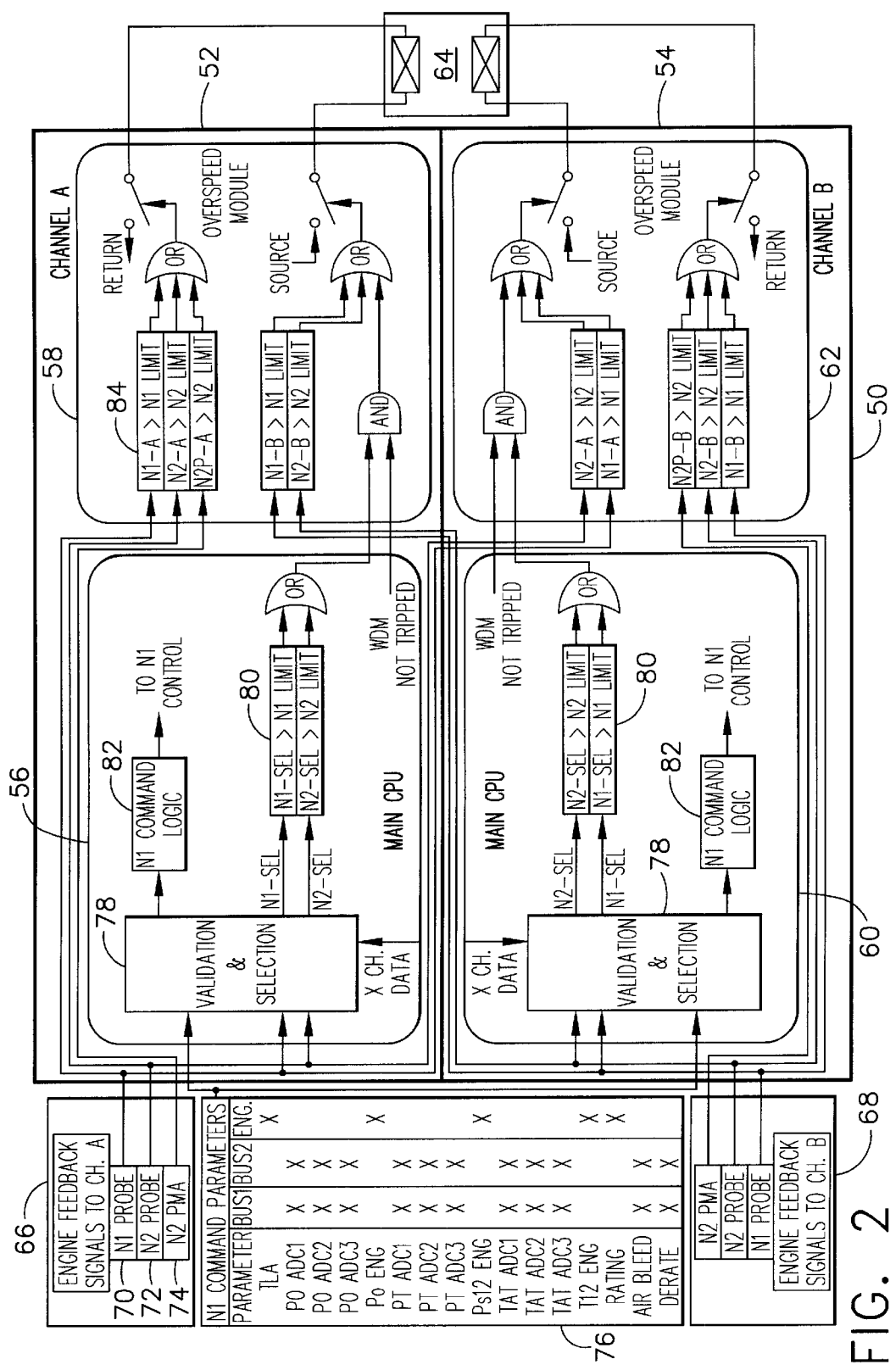
FIG. 2 is a schematic diagram of one known engine control system with independent engine overspeed protection.

FIG. 2 is a schematic diagram of an engine speed detection and control system 50 in accordance with the block diagram of system 10 shown in FIG. 1. System 50 is redundant and includes two identical engine control channels, control channel A 52 and control channel B 54. Channel A 52 includes a main central processing unit 56 and an overspeed module 58. Channel B 54 also includes a main central processing unit 60 and an overspeed module 62. Overspeed modules 58 and 62 are equipped with logic circuitry or other means of protecting an engine when an overspeed condition has been detected by routing a signal to a fuel cutback device 64.

Control channel A 52 and control channel B 54 receive inputs from sensors (not shown) which are also dual redundant. Control channel A 52 receives sensor input from sensor inputs 66 while control channel B 54 receives sensor input from sensor inputs 68. Inputs from sensor inputs 66 are cross-connected from channel A 52 to channel B 54. Respectively, inputs from sensor inputs 68 are cross-connected from channel B 54 to channel A 52. Certain inputs from inputs 66 are routed into overspeed module 62 of control channel B 54 and certain of inputs from inputs 68 are routed to overspeed module 58 in control channel A 52.

In the exemplary embodiment shown, inputs 66 are an N1 probe 70 which represents an engine speed reading from a sensor sensing a phonic wheel on a fan shaft (not shown) of an engine, and is referred to as a fan speed probe. N2 Probe 72 represents an engine speed reading from a sensor sensing a gear from a gear box (not shown) which is driven by the engine core (not shown). N2 PMA 74 represents an engine speed reading from a sensor sensing the sinusoidal alternator voltage. The same data from a second set of identical sensors is available at input 68. N1 command parameters 76 include other inputs to system 50, which after validation and selection in module 78 are used in module 82 to compute a fan speed (N1) command.

N1 probe 70, N2 Probe 72 and N1 command parameters 76 are inputs into a validation and selection module 78 within main central processing units 56 and 60. Validation and selection module 78 is configured to select the best sensor data available using a logical algorithm. Best sensor data is defined as data from the sensor that has readings with the least variations. In one embodiment, the algorithm will choose to model N1 and N2 if all of the sensor readings are above a particular threshold with respect to the variations in sensor readings, otherwise an average of the sensor readings are used. As shown by test box 80, if the selected N1 and N2 readings, either modeled or averaged from sensor readings, are greater than a predetermined limit, an error signal is generated and transmitted to overspeed module 58, which in turn connects a source of power to fuel cutback device 64.

In overspeed module A 58, sensor readings from both inputs 66 and 68 are compared to pre-determined limits to determine if an error condition exists. If any of N1 probe 70, N2 Probe 72 or N2 PMA 74 from inputs 66, as shown in test box 84, shows a condition that is out of tolerance with the pre-determined limits, a return line from fuel cutback device 64 is connected to a power source return. As an alternate to the signal from test box 80, if the equivalent sensor readings from input 68 and as shown in test box 86, show an error condition, a source of power will be connected to fuel cutback device 64. Fuel to the engine is cut back only when the signal from test box 86 connects a power source to fuel cutback device 64 and the signal from test box 84 connects the return line from fuel cutback device 64, thus preventing spurious energizing of fuel cutback device 64. While only one channel 52 of system 50 is fully described, the same description applies to channel B 54, which also can cause fuel cutback device 64 to engage.

Figure 3:
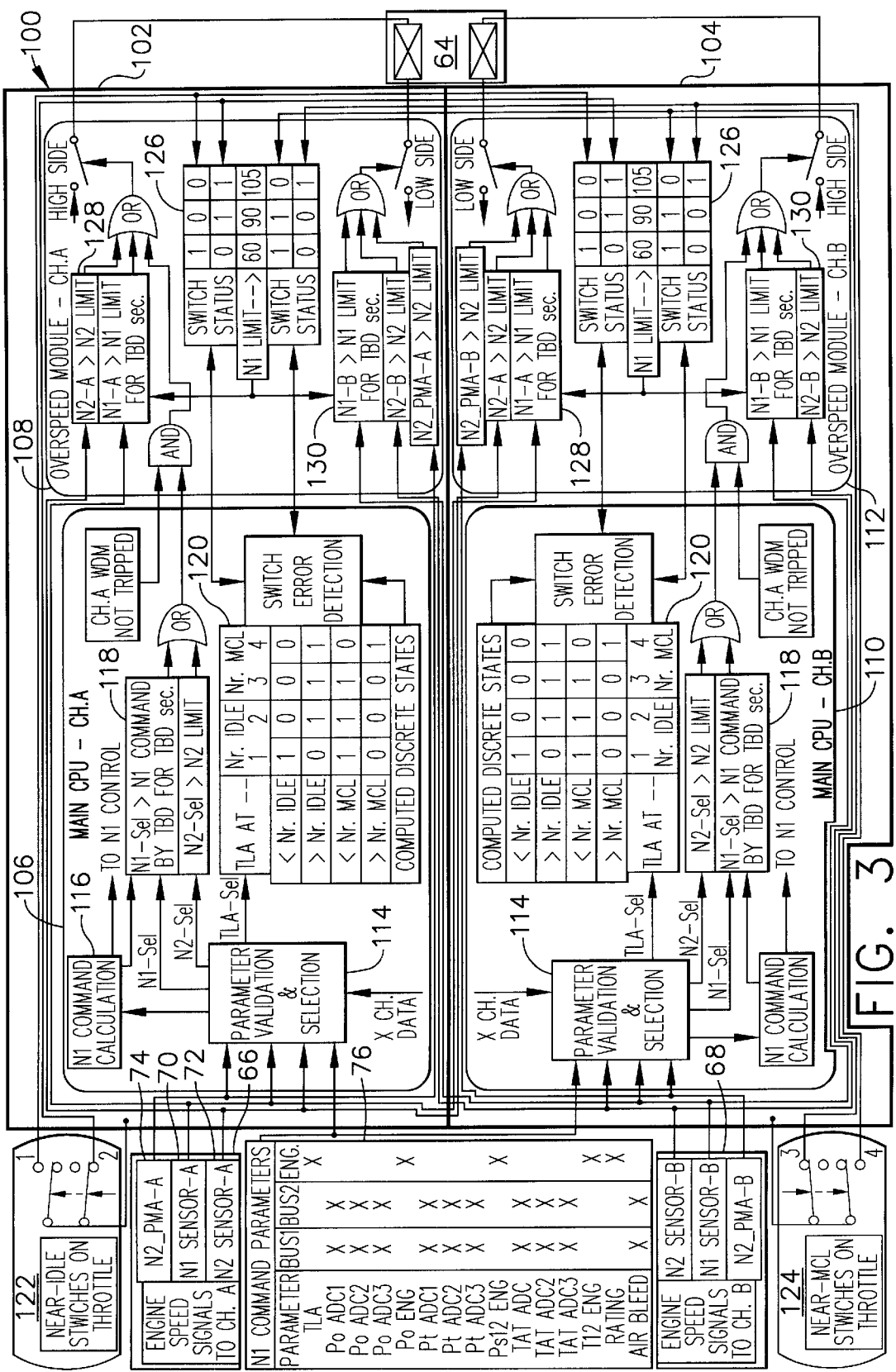
FIG. 3 (is a schematic diagram of an adaptation of the overspeed protection system shown in FIG. 2 to provide overthrust protection.

FIG. 3 is a schematic diagram of one embodiment of an engine overspeed and overthrust detection and control system 100. In addition to systems in place for detection and control of engine overspeed similar to those described in FIG. 2, included in FIG. 3 are systems and logic to detect and control engine overthrust. As shown in FIG. 3, system 100 is dual redundant and includes two identical engine control channels, control channel A 102 and control channel B 104. Channel A 102 includes a main central processing unit 106 and an overspeed module 108. Channel B 104 also includes a main central processing unit 110 and an overspeed module 112. Overspeed modules 108 and 112 are equipped with logic circuitry and other means of limiting fuel flow to an engine when an overspeed/overthrust condition has been detected by routing a signal to a fuel cutback device 64.

Inputs 66 and 68 are identical to those described in FIG. 2. Inputs 66 and 68 include the same two redundant sets of sensors N1 probe 70, N2 Probe 72 and N2 PMA 74 as described above. N1 command parameters 76 are also included. All of N1 probe 70, N2 Probe 72, N2 PMA 74 and N1 command parameters 76 are inputs into a validation and selection module 114 within main central processing unit 106. The same type of sensor data from the second set of sensors from input 68 and N1 command parameters 76 are input into a validation and selection module 114 within processing unit 110. Validation and selection module 114 selects or models the best engine control parameters as previously described. Another function of validation and selection module 114 is to output signals to module 116 which generates a fan speed (N1) command. One error condition detected within main central processing unit 106 is resultant from a comparison of the selected fan speed probe signal to the calculated fan speed command 1170. In the embodiment shown in FIG. 3, comparison 118 is modified. If the selected fan speed probe signal is greater than calculated fan speed command 116 by a predetermined amount and for a predetermined length of time, an error exists and logic activates a switch connecting one side of the power supply to fuel cutback device 64.

In the embodiment shown in FIG. 3, validation and selection module 114 further selects and outputs a throttle lever angle (TLA-Sel) signal to a table 120 which determines the expected throttle position based on a state of switches 122 and 124 on the throttle. The TLA-sel signal is compared to an independent determination of the positions of a near-idle switch 122 and a near maximum climb switch 124, which in combination are referred to as sensed aircraft throttle position. Sensed aircraft throttle position is input to overspeed module 108 from two switches, namely 122, detecting near-idle throttle position and 124 detecting near max climb throttle position. These switch positions are compared with the expected throttle positions determined, as described previously, in table 120 and any disagreement communicated to the Main CPU 106 and to the Overspeed Module 108.

Sensed aircraft throttle position further determines a maximum fan speed limit as shown in table 126. The maximum fan speed limit is compared to a sensor fan speed from N1 probe 70. If sensor fan speed from N1 probe 70 is greater than maximum fan speed limit as determined from aircraft throttle position switches for a predetermined length of time as shown in test box 128, an error condition has occurred and a switch is closed connecting a power source to fuel cutback device 64. Overspeed module 108 is further configured to perform the same comparison with B-channel sensor data as shown in test box 130, resulting in a switch closure which connects the power return line from fuel cutback device 64.

Control channel B 104 is redundant to control channel A 102, and includes the same error detection schemes and switch position determinations and signal applications to fuel cutback device 64 as control channel A 102. It should be understood that while the embodiments described in FIG. 3 describe aircraft throttle switch inputs as the device inputting aircraft throttle position to overspeed modules 108 and 112 other devices may be employed, for example, proximity switches, photoelectric sensors, Rotary Variable Differential Transformers (RVDT), Linear Variable Differential Transformers (LVDT) and other transducer devices.

The control techniques above described adapt the best of known overspeed logic by adding test conditions in the main CPUs and the independent overspeed modules that sense and react to engine fan speed in excess of that computed from the aircraft throttle input. To provide additional protection from CPU computational errors, independent determination of aircraft throttle position is made by using sensors on the throttle itself. Comparison of the throttle position computed by the CPUs and the throttle position detected in the overspeed modules indicate difference faults and provide an independent test for overthrust conditions. While the overspeed modules described above are referred to as being independent, and shown as such in FIGS. 1, 2 and 3, independence refers to functionality only. It is understood that the overspeed modules may be embodied as either hardware separate from the main CPU modules or, in the alternative, may be embodied as a separate function within the main CPU modules.

The control technique above described is adaptable for alternate jet engine thrust parameters such as engine pressure ratio and core speed. While the invention has been described in terms of various specific embodiments, those skilled in the art will recognize that the invention can be practiced with modification within the spirit and scope of the claims.

What is claimed is:

1. A method for operating a jet engine, said method comprising the steps of:

determining aircraft throttle position using at least one sensor mounted to an aircraft throttle;

testing for engine overthrust conditions in a first processing unit by utilizing an input from the aircraft throttle;

testing for engine overthrust conditions using a second processing unit distinct from the first processing unit by utilizing the aircraft throttle input;

utilizing the first processing unit to determine jet engine thrust in excess of thrust computed based on the aircraft throttle input; and utilizing the second processing unit to determine jet engine thrust in excess of thrust computed based on the aircraft throttle input.

2. A method according to claim 1 wherein said step of testing for engine overthrust conditions in a first processing unit further comprises the step of determining engine fan speed.

3. A method according to claim 1 wherein said step of testing for engine overthrust conditions using a second processing unit further comprises the steps of:

making an independent determination of aircraft throttle position based on input(s) from alternate aircraft throttle position sensor(s);

communicating sensed throttle positions to the main CPU module; and comparing sensed throttle positions communicated to the main CPU module to throttle positions sensed by the main CPU module.

4. A method according to claim 1 wherein said step of testing for engine overthrust conditions in a first processing unit further comprises the steps of:

determining if a sensed engine fan speed is greater than a commanded engine speed plus a predefined tolerance for longer than a predetermined period of time; and engaging an engine fuel cutback device if the sensed engine fan speed is greater.

5. A method according to claim 1 wherein said step of testing for engine overthrust conditions using a second processing unit further comprises the steps of:

determining if sensed engine fan speed from at least one engine fan speed sensor is greater than a variable fan speed limit determined by sensed throttle position for a predetermined period of time; and engaging an engine fuel cutback device if the sensed engine fan speed is greater.

6. A method according to claim 1 wherein said step of testing for engine overthrust conditions in a first processing unit further comprises the step of determining an engine pressure ratio.

7. An apparatus for jet engine overspeed protection comprising:

a main central processing unit (CPU) module configured to determine a sensed engine fan speed; and an independent overspeed module comprising sensors to determine a sensed throttle position, at least one said sensor mounted on the aircraft throttle, said overspeed module configured to compare the sensed engine fan speed to a variable engine fan limit speed.

8. An apparatus according to claim 7 wherein said overspeed module further comprises a circuit which compares sensed engine fan speed from at least one engine fan speed sensor to a variable engine fan speed limit calculated as a function of sensed throttle position.

9. An apparatus according to claim 8 wherein said overspeed module is configured to engage an engine fuel cutback device if sensed engine fan speed is greater than the variable engine fan speed limit for a predetermined length of time.

10. An apparatus according to claim 7 wherein said main CPU module is configured to receive throttle positions read by said overspeed module and to compare received throttle positions to a sensed throttle position.

11. An apparatus according to claim 7 wherein said CPU module is configured to engage an engine fuel cutback device if sensed engine fan speed from a selected engine fan speed sensor is greater than a commanded engine fan speed by a predetermined amount for a predetermined length of time.

12. An apparatus according to claim 7 further comprising a second, redundant main central processing unit module and a second, redundant overspeed module.

13. An apparatus according to claim 7 wherein said main central processing unit module is configured to determine an engine pressure ratio.

14. A jet engine overspeed protection control system comprising:

an engine overspeed protection apparatus comprising a main central processing unit (CPU) module and an overspeed module, said overspeed module comprising a circuit to determine sensed throttle positions;

a plurality of sensors configured to transmit engine speed readings to said apparatus;

a plurality of aircraft throttle position sensors configured to transmit intended engine speed to said apparatus, at least one said aircraft throttle position sensor mounted on the aircraft throttle for determining a sensed position of the aircraft throttle; and an engine fuel cutback device configured to reduce fuel supplied to an engine.

15. A jet engine overspeed protection control system according to claim 14 wherein said overspeed module further comprises a circuit which compares sensed engine fan speed from at least one engine fan speed sensor to a variable engine fan speed limit calculated from sensed throttle positions.

16. A jet engine overspeed protection control system according to claim 15 wherein said overspeed module is configured to engage said engine fuel cutback device if sensed engine fan speed is greater than the variable engine fan speed limit for a predetermined length of time.

17. A jet engine overspeed protection control system according to claim 14 wherein said main CPU module is configured to receive throttle position read by said overspeed module and to compare received throttle position to a sensed throttle position transmitted from said aircraft throttle position sensors.

18. A jet engine overspeed protection control system according to claim 14 wherein said CPU module is configured to engage an engine fuel cutback device if a sensed engine fan speed from a selected engine fan speed sensor is greater than a commanded engine fan speed by a predetermined amount for a predetermined length of time.

19. A jet engine overspeed protection control system according to claim 14 wherein said engine overspeed/ overthrust apparatus further comprises a second, redundant main central processing unit module and a second, redundant overspeed module.

20. A jet engine overspeed protection control system according to claim 14 wherein said CPU module is configured to determine an engine pressure ratio.

* * * * *